United States Patent [19]
Model

[11] Patent Number: 5,669,315
[45] Date of Patent: Sep. 23, 1997

[54] CORRUGATED PALLET AND PALLET FOOT

[76] Inventor: Peter L. Model, 1310 E. Thirteenth St., Chattanooga, Tenn. 37404

[21] Appl. No.: 606,858

[22] Filed: Feb. 26, 1996

Related U.S. Application Data

[63] Continuation-in-part of Ser. No. 463,245, Jun. 5, 1995.

[51] Int. Cl.$^6$ ............................................. B65D 19/00
[52] U.S. Cl. ........................ 108/56.3; 108/53.3; 108/51.3
[58] Field of Search ................................. 108/51.3, 53.3, 108/51.1, 53.1, 56.3, 53.5

[56] References Cited

U.S. PATENT DOCUMENTS

| | | |
|---|---|---|
| 2,925,978 | 2/1960 | Marso . |
| 3,141,422 | 7/1964 | Woolworth . |
| 3,470,832 | 10/1969 | Heffernan . |
| 3,605,651 | 9/1971 | Stewart . |
| 4,015,544 | 4/1977 | Szatkowski . |
| 4,221,751 | 9/1980 | Haataja et al. . |
| 4,244,766 | 1/1981 | Yellen . |
| 4,248,163 | 2/1981 | Caughey . |
| 4,674,414 | 6/1987 | Nulle et al. . |
| 5,142,994 | 9/1992 | Sandberg et al. . |
| 5,289,781 | 3/1994 | Beckway . |
| 5,327,839 | 7/1994 | Herring et al. . |
| 5,366,790 | 11/1994 | Liebel . |
| 5,413,662 | 5/1995 | Skinner, III . |
| 5,535,668 | 7/1996 | Besaw et al. . |

FOREIGN PATENT DOCUMENTS

| | | |
|---|---|---|
| 0 494 540 A2 | 7/1992 | European Pat. Off. . |
| 0 604 106 | 6/1994 | European Pat. Off. . |
| 2676711 | 11/1992 | France . |
| 2679482-A1 | 1/1993 | France . |
| 93 04 721.5 | 7/1993 | Germany . |

OTHER PUBLICATIONS

"La Palette Ecologique", Emballage Digest, vol. 32, No. 361, p. 131, Boulogne, France, Dec. 1991.

Primary Examiner—Peter M. Cuomo
Assistant Examiner—Hanh V. Tran
Attorney, Agent, or Firm—Robert Platt Bell & Associates, P.C.

[57] ABSTRACT

A pallet and pallet foot is made of corrugated materials such that the entire pallet and pallet foot may be recycled with other corrugated materials (e.g., boxes or the like). The pallet foot is made from shredded corrugated waste which is made into a slurry and molded, using a wet pulp process, to form a molded pallet foot. The pallet foot may be glued to a corrugated deck provided with cutouts in the deck surface. Cutouts accept pallet feet from another pallet such that multiple pallets may be stacked in a nesting manner. The pallet feet may be further fortified with a water resistant coating. The resulting pallet is lightweight, strong, and readily recyclable.

10 Claims, 3 Drawing Sheets

100

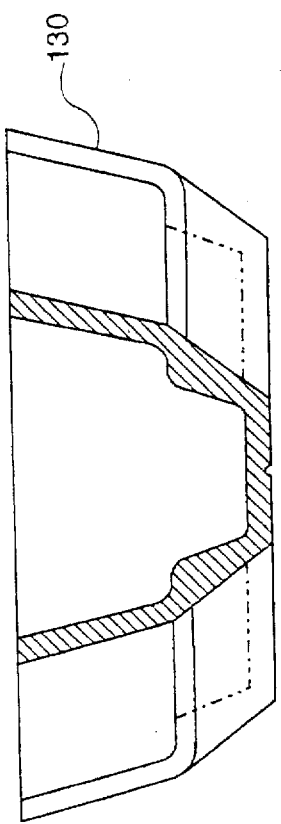
Figure 4
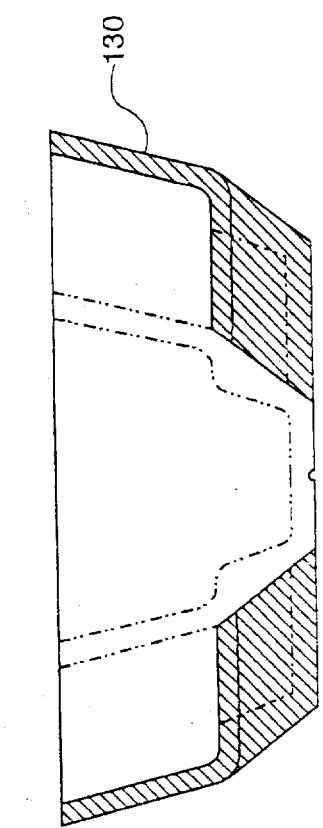
Figure 6
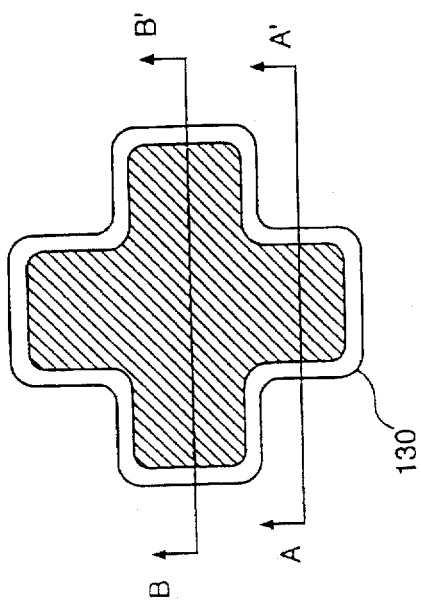
Figure 3
Figure 5

5,669,315

CORRUGATED PALLET AND PALLET FOOT

CROSS-REFERENCE TO RELATED APPLICATIONS

This application is a continuation-in-part of copending U.S. patent application Ser. No. 08/463,245, filed Jun. 5, 1995, entitled "CORRUGATED PALLET AND PALLET FOOT".

FIELD OF THE INVENTION

The present invention is related to the area of shipping pallets, in particular, pallets made of corrugated cardboard materials which may be readily recyclable.

BACKGROUND OF THE INVENTION

Pallets may be required in shipping goods in order to provide a stable platform for supporting such goods and provide platform which may be readily manipulated by material handling machines such as forklifts or the like. Historically, wood pallets have generally served this purpose. However, such wood pallets have a number of drawbacks.

Wood pallets are relatively expensive to produce and heavy. Sound lumber for building pallets is relatively expensive, and labor required to assemble such pallets may be relatively extensive. In an effort to reduce costs, many wood pallet producers have resorted to using lower grades of unseasoned and/or untreated lumber commonly known as "pallet lumber". Pallet lumber may have a rough, splintery finish and may be prone to cracking, warping or the like. Such rough finishes may present a splinter hazard and may be unsuitable for use, for example, in food handling applications. Moreover, such low grades of lumber may readily split or break, resulting in pallet failure.

In addition, heavy pallets may increases shipping costs, which typically may based on weight. Moreover, the bulk of wood pallets makes them inconvenient to store and return ship. Thus, it has been a long felt need to provide a pallet which is lightweight, inexpensive, readily stackable (nestable), strong, and has smooth outward surfaces.

In addition, with the advent of recycling technologies, it is desirable to make shipping materials which may be readily recyclable at the end of their useful lives. Wooden pallets may not be readily recyclable, as the grades of lumber used may be unsuitable for other purposes or for conversion into paper or the like. Moreover, the presence of nails or staples in wooden pallets may make them more difficult to recycle, as the wooden pallet is not composed of a homogenous material.

A demand exists for recycled materials such as corrugated cardboard boxes, which may be readily remanufactured into new corrugated cardboard. It is a largely homogenous material (with the exception of minor amounts of adhesive and printing ink, which are acceptable in the recycling process) and may be readily collected at a number of discrete sites (e.g., warehouse, retail store, or the like). Pallets may be used to support a number of corrugated containers (e.g., boxes) which may be attached to a pallet using suitable means (e.g., strapping, shrink-wrap or the like). Thus, it may be desirable to provide a pallet which may be recyclable in the same material stream as accompanying corrugated containers.

In the prior art, several have tried to develop improved pallets which attempt to solve all or part of the problems outlined above.

Stewart, U.S. Pat. No. 3,605,651, issued Sep. 20, 1971, discloses a low-cost disposable type pallet including a load-supporting deck panel of inexpensive material. The pallet has a plurality of sockets into which are locked separately produced, inexpensive, hollow, molded legs which project below the panel. These legs may support the pallet and may be distributed throughout its area to provide spaces for receiving the tines of a fork-lift truck. A deck panel made of inexpensive material such as a multiple-wall corrugated board or other low-cost board of either plastic, wood fiber, or paper is contemplated. The legs are preferably molded from any one of a number of plastics, but could be die-cast from metal or made out of other materials, such as pressed fiber material, according to conventional processes.

The Stewart pallet, however, may not be readily recyclable. Stewart discloses a pallet with a deck which may be made of corrugated material and legs made of differing material. In order to recycle the Stewart pallet, it may be necessary to remove the legs prior to shredding the pallet in order to provide a homogenous stream of recyclable material.

Woolworth, U.S. Pat. No. 3,141,422, issued Jul. 21, 1964, discloses a knock-down, reusable pallet having legs made of molded pulp and forming load supporting components of the assembled pallet. The molded pulp legs of Woolworth, however appear to be made of a different material than the corrugated retaining sheet. Thus, it appears that the Woolworth pallet is made of heterogenous materials and may require disassembly before recycling. Moreover, the screw-on legs of Woolworth protrude above the surface of the pallet deck, making for an uneven loading surface. In addition, the screw on legs of Woolworth, which may make assembly and disassembly easier, may also increase the cost of manufacturing the pallet.

Beckway, U.S. Pat. No. 5,289,781, issued Mar. 1, 1994, discloses a corrugated pallet leg and method. Core legs are attached to the pallet deck by means of die cutting a plurality of finger members in a spiral configuration such that the cores may be attached by twisting an inner core leg into an opening created by the die cut pattern of the finger elements and interposing the finger elements between the inner leg and the outer leg element.

The Beckway pallet uses paper cores for the legs—a material which may be different from the corrugated cardboard of the pallet deck, thus making the pallet not readily recyclable. Moreover, since the legs are attached to two pallet decks, the resulting pallet may not be readily stackable.

Sandberg et al., U.S. Pat. No. 5,142,994, issued Sep. 1, 1992, discloses a method and apparatus for forming a pallet with deep drawn legs from flake-like wood particles mixed with a binder. A loosely felted mat of wood flakes mixed with a binder is placed between dies in a press and compressed to form a load supporting deck and hollow legs extending downwardly from the deck, the legs being formed integrally with the deck. The wood fibers of Sandberg may not be as readily recyclable as other materials (e.g., corrugated cardboard) for which there is a ready market.

Nulle et al. U.S. Pat. No. 4,674,414, issued Jun. 23, 1987 discloses a one-piece pallet formed of a non-risable mixture of fibers and a heat-hardenable binding agent. The fibers can be ligno cellulose-containing fibers, comminuted and dried wood chips, bagasse fibers and the like. As with Sandberg, the Nulle pallet may not be readily recyclable with corrugated cardboard materials.

Haataja et al. U.S. Pat. No. 4,221,751, issued Sep. 9, 1980, discloses an article, molded as a one-piece unit from a paper mill sludge, such as a pallet having a substantially flat deck member and a plurality of hollow legs projecting from the deck member. Dried, comminuted paper mill sludge is blended with a fibrous reinforcing material, preferably a cellulose material such as fibrous bark particles, and a resinous particle board binder. Thus use of fibrous bark particles for reinforcement may make the pallet less recyclable.

Heffernan U.S. Pat. No. 3,470,832, issued Oct. 7, 1969, discloses a pallet structure having two horizontal platforms serving to hold hollow shell leg supports which are nestable one into the other and reinforcement means connected integral with the platforms and the leg structure. Reinforcement straps 17 may be made of woven plastic fiber which may prohibit recycling in a paper mill. In addition, Heffernan discloses using metal reinforcements 18 which may further complicate the recycling process.

Marso U.S. Pat. No. 2,925,978, issued Feb. 23, 1960, discloses a pallet made of folded and cut corrugated cardboard. Such a pallet may be more readily recyclable in a corrugated cardboard recycling stream, however, the Marso pallet is not readily nestable, nor does it appear that the Marso pallet has significant strength.

Szatkowski U.S. Pat. No. 4,015,544, issued Apr. 5, 1977, discloses a disposable pallet with folded and cut corrugated cardboard legs. The Szatkowski pallet, while appears to be all corrugated material, may not be readily nestable, as the indents made by the feet of the pallet are covered by a corrugated sheet. In addition, it does not appear that the Szatkowski pallet provides significant strength.

Caughey U.S. Pat. No. 4,248,164, issued Feb. 3, 1981, discloses a unitarily formed pallet made of bonded wood particles. Although nestable, the Caughey pallet may not be readily recyclable.

An all-corrugated material pallet is very desirable, as noted above, as such a pallet may be recycled along with corrugated containers carried on the pallet. In warehouses and retail stores (e.g., mall or the like) it is known to provide a separate compactor for compacting and storing corrugated waste. Such waste may then be retrieved and recycled into new corrugated material. In addition to the designs noted above, several attempts have been made by others to produce an all-corrugated pallet by mimicking the design of a wood pallet, using layers of corrugated material in place of wood boards. Such pallets may be heavy and expensive, as to achieve equivalent strength of a wood pallet, several layers of corrugated material may need to be used (e.g., as many as 16 layers). Moreover, such pallets, like their wood forebears, may not be readily nestable.

Moreover, another requirement of pallet design may be that the pallet be suitably water-resistant. Water spills, rain, condensation and the like may be present in warehouses, loading docks, trucks, railcars, and the like. Moreover, in many instances a risk of flooding may occur (e.g., burst pipe or the like) where a pallet may be placed in small amounts of standing water. Corrugated pallets of the prior art may not be suitably equipped to sustain such flooded conditions. Moreover, alternative pallet foot designs such as those discussed above (e.g., paper core, wood or paper pulp or the like) may disintegrate under such conditions.

SUMMARY AND OBJECTS OF THE INVENTION

It is an object therefore, of the present invention, to provide a pallet composed of a homogenous material which may be readily recyclable.

It is a further object of the present invention to provide a pallet which is lightweight.

It is a further object of the present invention to provide a pallet which is nestable.

It is a further object of the present invention to provide a pallet which has a relatively high strength.

It is a further object of the present invention to provide a pallet which may be made entirely of corrugated cardboard and corrugated cardboard waste materials.

It is a further object of the present invention to provide a pallet which may be readily manufactured using existing manufacturing equipment.

A recyclable pallet comprises a substantially planar deck portion formed of a recyclable material and a plurality of feet formed of scrap pieces of the recyclable material produced in the formation of the substantially planar deck portion. The feet are attached to the substantially planar deck portion with an adhesive compatible with a recycling process of the recyclable material.

The substantially planar deck portion further comprises a plurality of openings formed in the substantially planar deck portion. Each of the plurality of openings has a shape and size substantially the same as the plurality of feet so as to accept a foot from an adjacent pallet in a nesting fashion.

The plurality of feet are each composed of shredded scrap recyclable material formed using a wet pulp process, molded into a predetermined shape, and attached to a corrugated deck using an adhesive compatible with the recycling process. The recyclable material comprises corrugated cardboard, specifically Doubled Lined Kraftliner. The adhesive comprises liquid UF Resin.

Each of the plurality of feet is formed into a substantially cruciform shape having a concave upward surface and a convex lower surface, the concave upward surfacing being attached to the substantially planar deck portion so as to contact a periphery of one of the plurality of openings.

A method of making a pallet comprises the steps of forming a substantially planar deck portion from a recyclable material, forming a plurality of feet using a wet pulp process from shredded pieces of the recyclable material produced in the formation of the substantially planar deck portion, and attaching the plurality of feet to the substantially planar deck portion with an adhesive compatible with a recycling process of the recyclable material. The adhesive comprises liquid UF Resin.

The method further comprises the step of forming a plurality of openings formed in the substantially planar deck portion, each of the plurality of openings having a shape and size substantially the same as the plurality of feet so as to accept a foot from an adjacent pallet in a nesting fashion. The step of forming the plurality of feet further comprises the steps of shredded scrap recyclable material produced in the step of forming the substantially planar deck portion into a pulp form and, using a wet pulp process, molding shredded scrap recyclable material into a predetermined shape.

The step of molding further comprises the step of molding shredded scrap recyclable material, using a wet pulp process, into a substantially cruciform shape having a concave upward surface and a convex lower surface, the concave upward surfacing being attached to the substantially planar deck portion so as to contact a periphery of one of the plurality of openings.

BRIEF DESCRIPTIONS OF THE DRAWINGS

FIG. 3 is a top view of pallet foot 130.

FIG. 4 is an end cross-section view of pallet foot of FIG. 3 along line 1—1'.

FIG. 5 is a bottom view of the pallet foot of FIG. 2.

FIG. 6 is a side cross-section view of the pallet foot of FIG. 3 along line 2—2'.

DETAILED DESCRIPTION OF THE INVENTION

Figure 1:
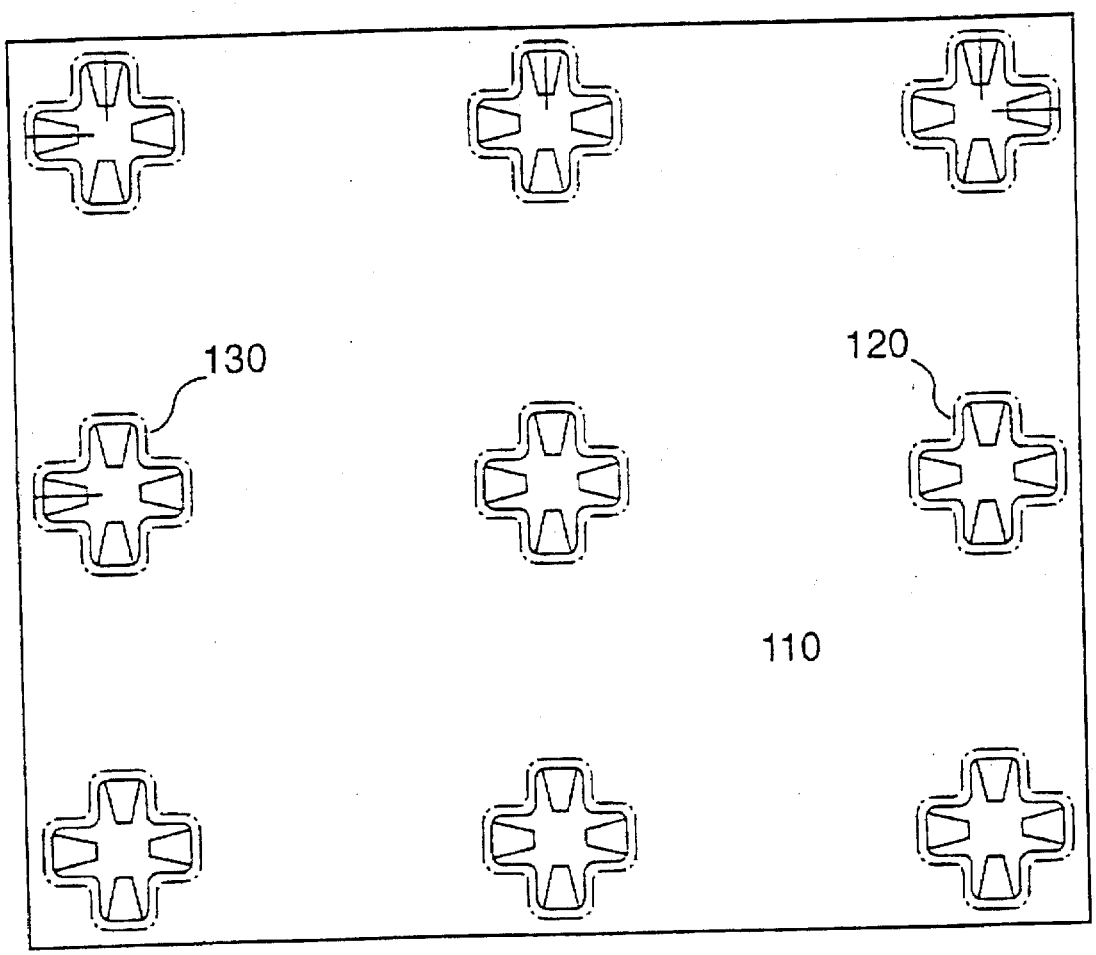
FIG. 1 is a top view of one embodiment of the pallet of the present invention.

FIG. 1 is a top view of one embodiment of pallet 100 of the present invention. Pallet 100 may be suitably sized to standard pallet dimensions (e.g., 40"×48" or the like). Pallet 100 may include deck 110 comprising one or more layers of corrugated cardboard or the like, and may be die cut to a particular size. Formed in deck 110 may be a plurality of openings 120 which may also be formed during the die cutting process.

Each of openings 120 may have a cruciform shape of approximately 7¾" by 7¾". Each portion of the cruciform shape of openings 120 may be approximately 3" wide. Openings 120 may be suitably located within deck 110, preferably at a distance and pattern within the spacing of material handling devices (e.g., forklift or the like). In the preferred embodiment, openings 120 around the periphery of deck 110 may be located at a center distance of 4⅝" from the edge of deck 110.

Figure 2:
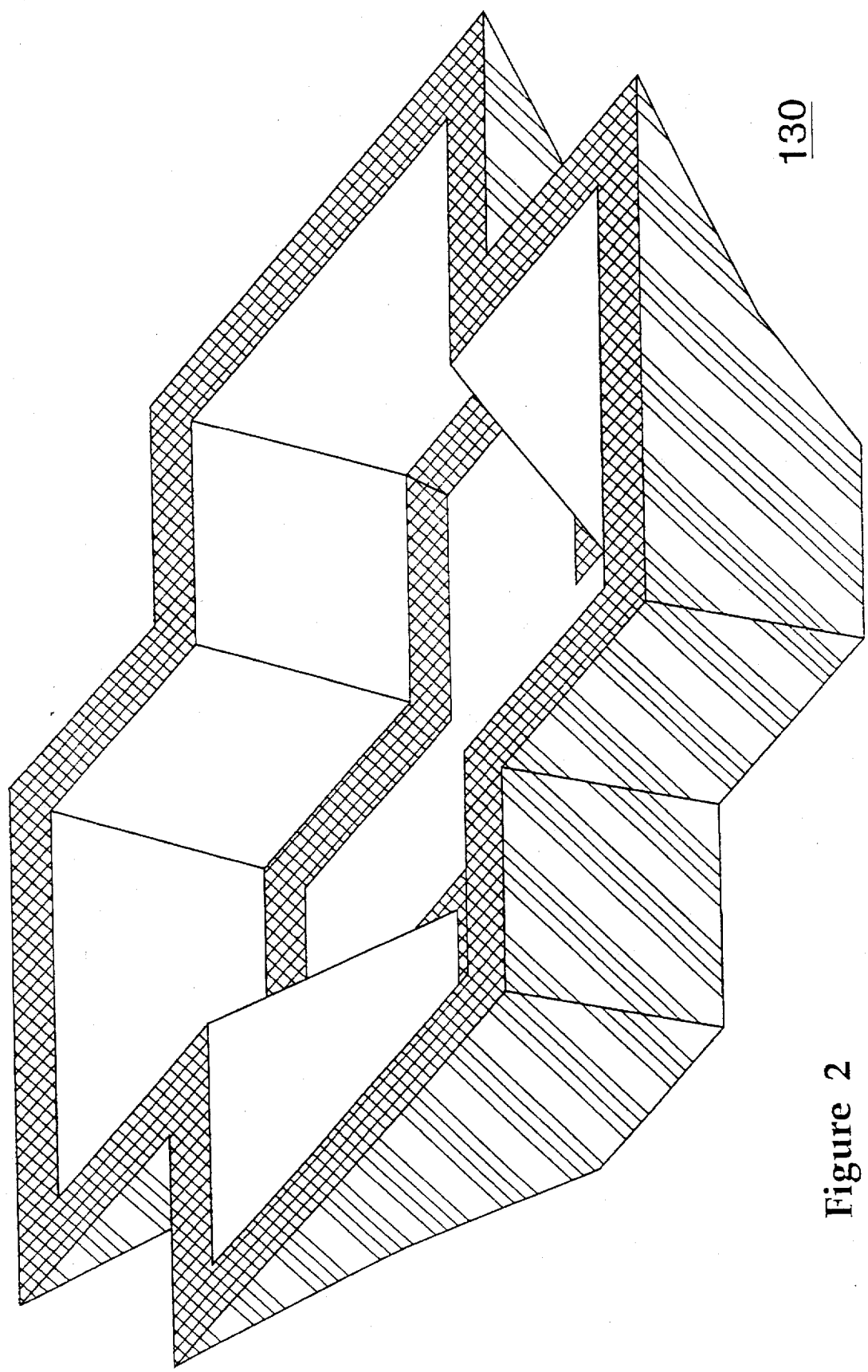
FIG. 2 is a perspective view of a pallet foot of the pallet of FIG. 1.

Surrounding each opening 120 in FIG. 1, is a dashed line indicating the outline of a pallet foot 130, portions of which may be seen through openings 120. FIG. 2 is a perspective view of pallet foot 130. Pallet foot 130 may be approximately 8½" by 8½" in size, in a substantially cruciform shape. Each leg of cruciform shaped pallet foot 130 may be approximately 4½" wide at its widest point and protrude approximately 2½". As illustrated in FIG. 2, pallet foot 130 may taper downwardly to a width of one inch at a bottom portion.

FIG. 3 illustrates a top view of pallet foot 130. FIG. 4 illustrates an end cross-section view of pallet foot 130 along line 1—1' of FIG. 3. FIG. 5 is a bottom view of pallet foot 130. FIG. 6 is a side cross-section view of pallet foot 130 along line 2—2' of FIG. 3. FIGS. 3–6 illustrate the details of pallet foot 130. It should be noted that the perspective view of FIG. 2 is schematic in nature. As discussed below, pallet foot 130 of the present invention may be formed using a molding process. Thus, the rounded and curved edges of pallet foot 130 as illustrated in FIGS. 3–6 are more representative of the preferred embodiment of the present invention.

Pallet foot 130 may have an inside dimension, as measured at the topmost portion of pallet foot 130, along one axis, of 7¾". Thus, when attached to deck 110 of FIG. 1, pallet foot 130 may provide a recessed portion for accepting another pallet foot of similar dimension. As noted above, pallet foot 130 may be gradually tapered such that successive pallets 100 may be suitably stacked atop one another in a nesting manner.

The cruciform shape of pallet foot 130 may provide sufficient strength for supporting a load, however, pallet foot 130 may be provided in other suitable shapes within the spirit and scope of the present invention.

Pallet foot 130 may be manufactured from corrugated cardboard, particularly waste scraps of corrugated cardboard such as Doubled Lined Kraftliner (DLK). DLK cuttings are standard waste produced in almost every corrugated sheet and box plant. DLK scraps are usually baled in a box plant and sent out to be recycled.

Pallet foot 130 may be formed using a molded wet process. DLK cuttings may be collected and shredded into a fibrous form and mixed with water to form a pulp slurry of approximately 1½ percent pulp and 98½ percent water. A wire screen male form is provided in the shape of the inner surface of pallet foot 130. The pulp slurry is them passed through the wire screen form using a slight vacuum to pull the pulp slurry into the screen form in a manner similar to conventional paper making.

The length of time in which the slurry is passed through the screen determines the thickness of the pallet foot. In the preferred embodiment, the pallet foot may be approximately ⅜" thick. Thickness may vary within the pallet foot to improve strength. Thus, for example, lower portion of the pallet foot may be as much as ½" thick.

A vacuum may then be applied to remove excess water, and a female form (metal or plastic) having a shape conforming to the desired outside contour of the completed pallet foot is applied to the outside of the first form. The female form has a shape and size so as to produce a pallet foot 130 as illustrated in FIGS. 3–6. Pressure may then be applied and the pulp dried. When the forms are removed, a pallet foot is formed.

Finished pallet feet 130 may then be glued to deck 110, again using a glue suitably compatible with the corrugated cardboard recycling process.

Although pallet foot 130 has substantial wet strength, wet strength may be further improved by dipping pallet foot 130 into a water repellent solution. In the preferred embodiment, pallet foot 130 is dipped into a water repellent solution to within ¾" of its overall height ("flood height"). A suitable waterproofing coating may comprise Michelman coating 40H manufactured by Michelman Coating, 9080 Shell Road, Cincinatti, Ohio 45236.

Pallet feet 130 may be applied to any size of corrugated sheet forming deck 110. Deck 110 may comprise a single, double or triple wall corrugated sheet, depending on strength requirements. Similarly, depending upon the amount of load to be carried, the number of pallet feet 130 applied to deck 110 may be varied. Generally, enough room may be left between pallet feet 130 such that material handling equipment (e.g., forklift or the like) may be inserted between at least some adjacent pallet feet 130.

Pallet foot 130, in the cruciform shape of FIGS. 3–6 has been tested to carry a static load of up to 1000 pounds for one pallet foot 130. The use of openings 120 in deck 110 allows multiple pallets of the present invention to be suitably nested to reduce space for storage and transportation. Pallet feet 130 are suitably strong enough to be used in roller conveyers, including roller conveyers in which rollers may abruptly change direction (e.g., at 90 degrees), inducing a severe shearing force which may tear off lesser constructed pallet feet.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A multi-component recyclable pallet comprising:

a substantially planar deck portion provided as a first component formed of a recyclable material; and a plurality of feet, provided as separate components, formed from shredded fibrous scrap pieces of the recyclable material molded, using a wet pulp process, into a predetermined shape and attached to said substantially planar deck portion with an adhesive.

2. The recyclable pallet of claim 1, wherein said substantially planar deck portion further comprises a plurality of openings formed in said substantially planar deck portion, each of said plurality of openings having a shape and size substantially the same as said plurality of feet so as to accept a foot from an adjacent pallet in a nesting fashion.

3. The recyclable pallet of claim 1, wherein said recyclable material comprises corrugated cardboard.

4. The recyclable pallet of claim 3, wherein said corrugated cardboard comprises double-lined corrugated paperboard.

5. The recyclable pallet of claim 4 wherein said adhesive comprises liquid resin.

6. The recyclable pallet of claim 3, wherein each of said plurality of feet is formed into a substantially cruciform shape having a concave upward surface and a convex lower surface, said concave upward surfacing being attached to said substantially planar deck portion so as to contact a periphery of one of said plurality of openings.

7. A recyclable pallet foot formed from scrap pieces of recyclable material the pallet foot composed of shredded fibrous scrap recyclable material, molded, using a wet pulp process, into a substantially cruciform shape having a concave upward surface and a convex lower surface, said concave upward surfacing for attaching to a substantially planar deck portion of a pallet so as to contact a periphery of one of a plurality of openings in the substantially planar deck portion.

8. The recyclable pallet foot of claim 7, wherein said recyclable material comprises corrugated cardboard.

9. The recyclable pallet foot of claim 8, wherein said corrugated cardboard comprises double-lined corrugated paperboard.

10. The recyclable pallet foot of claim 9 wherein said adhesive comprises liquid resin.

* * * * *